May 31, 1966  M. R. HUTCHINSON, JR  3,253,523
PHOTOELECTRIC EXPOSURE CONTROL SYSTEM
Filed March 18, 1963  10 Sheets-Sheet 1

MILLER R. HUTCHISON, JR.
INVENTOR.

BY R. Frank Smith
Eugene S. Stephens
ATTORNEYS

May 31, 1966  M. R. HUTCHISON, JR  3,253,523
PHOTOELECTRIC EXPOSURE CONTROL SYSTEM
Filed March 18, 1963  10 Sheets-Sheet 2

MILLER R. HUTCHISON, JR.
INVENTOR.

BY *R. Frank Smith*
*Eugene S. Stephens*
ATTORNEYS

May 31, 1966  M. R. HUTCHINSON, JR  3,253,523

PHOTOELECTRIC EXPOSURE CONTROL SYSTEM

Filed March 18, 1963  10 Sheets-Sheet 3

MILLER R. HUTCHISON, JR.
INVENTOR.

BY R. Frank Smith
Eugene S. Stephens
ATTORNEYS

May 31, 1966 M. R. HUTCHINSON, JR 3,253,523
PHOTOELECTRIC EXPOSURE CONTROL SYSTEM
Filed March 18, 1963 10 Sheets-Sheet 6

MILLER R. HUTCHISON, JR.
INVENTOR.

BY
ATTORNEYS

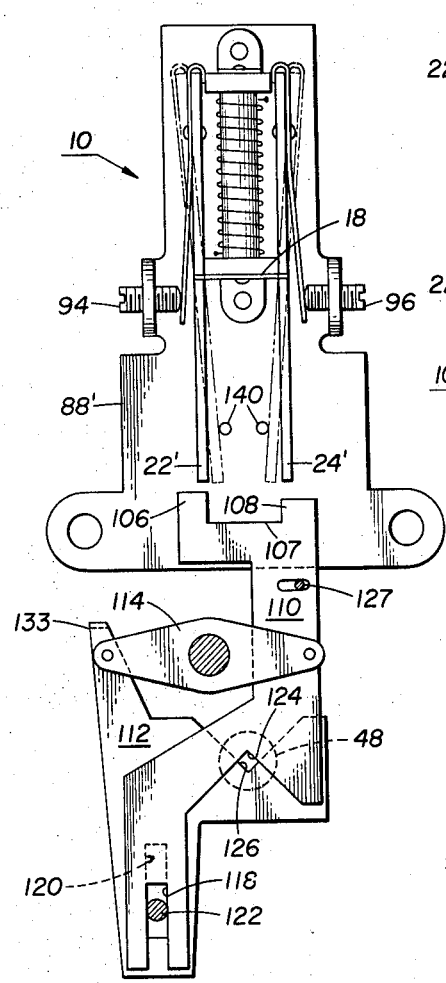

May 31, 1966   M. R. HUTCHINSON, JR   3,253,523
PHOTOELECTRIC EXPOSURE CONTROL SYSTEM
Filed March 18, 1963   10 Sheets-Sheet 8

MILLER R. HUTCHISON, JR.
INVENTOR.

BY R. Frank Smith
Eugene S. Stephens
ATTORNEYS

MILLER R. HUTCHISON, JR.
INVENTOR.

May 31, 1966   M. R. HUTCHINSON, JR   3,253,523
PHOTOELECTRIC EXPOSURE CONTROL SYSTEM
Filed March 18, 1963   10 Sheets-Sheet 10

MILLER R. HUTCHISON, JR.
INVENTOR.

BY R. French Smith
Eugene S. Stephens
ATTORNEYS

United States Patent Office 3,253,523
Patented May 31, 1966

3,253,523
PHOTOELECTRIC EXPOSURE CONTROL SYSTEM
Miller R. Hutchinson, Jr., Rochester, N.Y., assignor to Eastman Kodak Company, Rochester, N.Y., a corporation of New Jersey
Filed Mar. 18, 1963, Ser. No. 265,635
42 Claims. (Cl. 95—10)

This application is a continuation-in-part of my copending application Serial No. 191,977, filed May 2, 1962 and now abandoned.

The present invention relates to photoelectric exposure control for cameras, and more particularly concerns a simplified and improved exposure control system of this type.

Cameras having photoelectric exposure control systems have been known for many years. In general, a camera of this type includes a transducer comprising a photoelectric cell connected in operative relation with a drive means energized by the cell to adjust or condition either the lens diaphragm or the shutter speed or both in response to changes in field or scene brightness. The driving means most commonly employed in prior art systems comprises a galvanometer-type electric measuring instrument having a pivoted coil, which is positioned angularly as a function of field brightness. However, in commercial practice it has been found that such measuring instruments not only are more delicate than is desirable for an amateur camera, but also are relatively expensive to manufacture or purchase and to assemble into a camera, and require considerable attention for calibration and maintenance.

It is therefore a primary object of the present invention to regulate the exposure of film in a camera automatically in response to changes in field brightness by means of a simple, inexpensive and rugged device that is adapted to be controlled by a photoelectric cell when the latter is exposed to field light. This object is realized by employing an electromagnetic relay either to position or to control the positioning of a diaphragm or shutter speed member as a function of field brightness, energization of the relay being controlled, in turn, by the photocell.

In the past, certain attempts to employ electromagnetic relays in photoelectric exposure control systems have yielded unreliable results because their designs inherently failed to take into account the fact that the magnetic performance of a piece of "soft iron" is influenced by its previous magnetic history. (The term "soft iron," as used in the following description and claims, refers to any ferromagnetic material having relatively high magnetic permeability and relatively low residual magnetism.) The above effect is due to a magnetic property of iron termed "hysteresis," meaning a lag; that is, the effect lags behind the cause, and hence an immediate effect (magnetic flux) may be due to an immediate cause (magnetomotive force) modified by residual magnetism established by some previous cause. Depending upon the magnetic history of the relay in such a prior art system, the camera might seriously overexpose or underexpose film for any prevailing field brightness, even though the exposure control system is ostensibly in proper adjustment.

It is therefore an important object of the present invention to energize an electromagnetic relay in a photoelectric exposure control system so as to standardize the previous magnetic history of the soft iron prior to or during each operating cycle, and thereby substantially to eliminate performance errors attributable to hysteresis. More particularly, it is an object of the invention in regard to such an exposure control system, to cycle the soft-iron element or elements in an electromagnetic relay through a condition of substantial magnetic saturation during a first operating phase of the system, to desaturate such element or elements during a second operating phase, and to employ the relay as a driving or conditioning device during one, and always the same, phase of the hysteresis cycle. In connection with this object, it has been found that the driving or conditioning operation may be performed by the relay during the rising-flux phase of the hysteresis cycle, provided that during the previous cycle the soft-iron has been energized to substantial magnetic saturation so as to standardize its previous magnetic history. Also, the soft iron may be magnetized to substantial saturation alternately in each of two opposite senses of polarity during each cycle, with the driving or conditioning operation occurring during either of the two energizing or de-energizing phases of the cycle. Structural organizations employing such types of operation are clearly within the intended scope of the invention. However, for reasons appearing hereinafter, it has been found preferable to use the relay in its controlling or setting function during the falling-flux phase of a hysteresis cycle wherein the soft iron is saturated in only one polar sense during each operating cycle, and such control constitutes a specific object of the invention.

A further object of the invention is to employ such a relay in a structural organization wherein it directly operates a diaphragm mechanism or a shutter speed member or both.

Another feature of my invention is the step control of an exposure regulating member by a relay armature. Such control is found to be significantly less expensive than continuously variable regulation, and in many types of cameras provides adequate regulation. This feature of my invention may be employed in systems with or without soft iron in the relay.

According to another novel feature of the invention the relay is energized in one phase independently of the photocell, and in another phase under control of the photocell. A switching system connects the photocell into and out of the relay circuit for this purpose.

Another object of the invention is to employ such a relay in an exposure control system wherein it operates a diaphragm mechanism or a shutter speed member, or both, indirectly by limiting, in accordance with field brightness, its or their manual adjustment.

A further object of the invention is to simplify a photoelectric exposure control system in such manner that it is responsive only to a small number of ranges of field brightness and in turn provides a correspondingly small number of settings or conditionings of the lens diaphragm or shutter speed control member.

Other objects of the invention will appear from the following description, reference being made to the accompanying drawings, wherein:

FIG. 19 is a front view of a modification of the mechanism shown in FIG. 16;

FIG. 20 is a front view of a further modification of the mechanism shown in FIG. 16, wherein the manually moved member adjusts shutter speed rather than diaphragm opening;

FIGS. 21 and 22 are top and front views, respectively, of a mechanism for adjusting the relay air gaps;

FIGS. 23 and 24 are top and front views, respectively of alternate mechanisms for adjusting the relay air gaps;

BASIC EXPOSURE CONTROL SYSTEM

Figures 1, 2, 3:
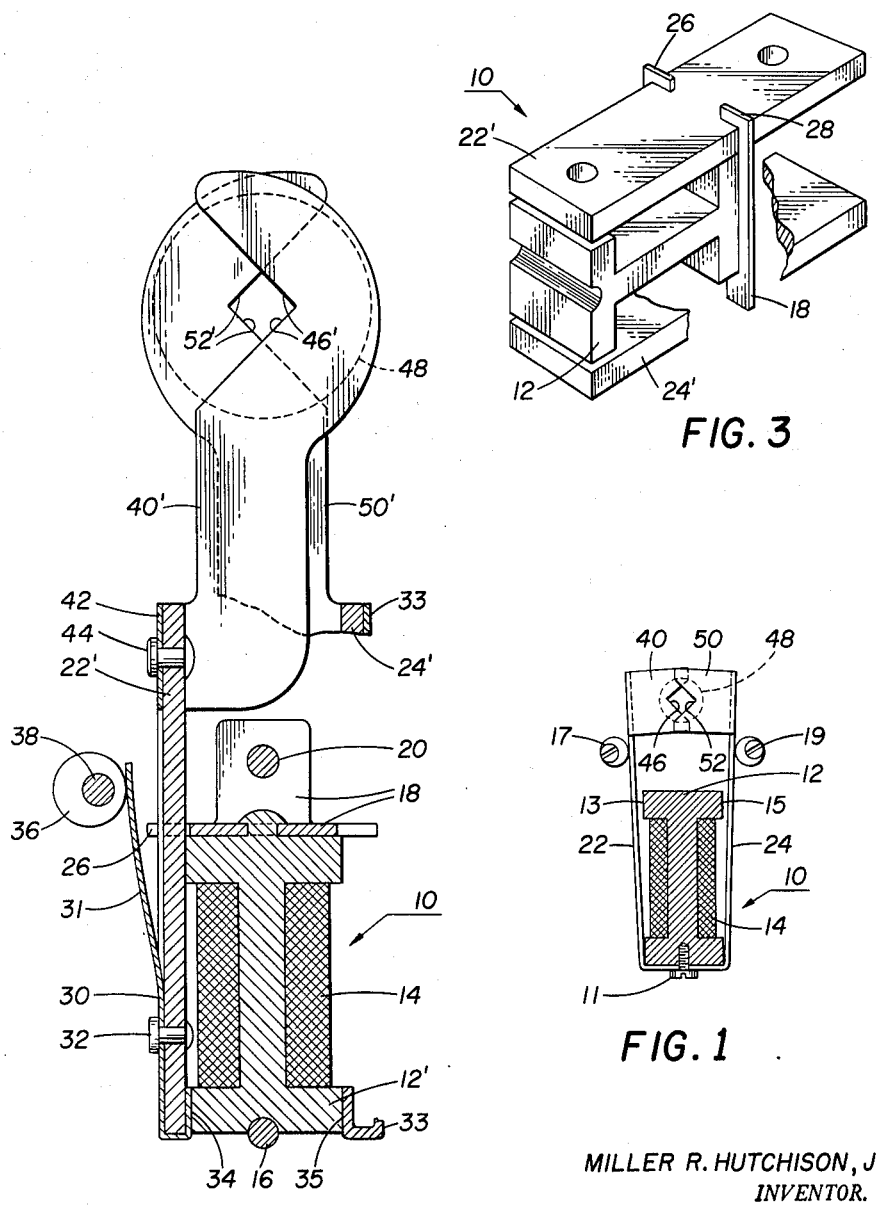
FIG. 1 is a front view, partly in section, of one embodiment of the control relay and a pair of diaphragm vanes operated thereby.
FIG. 2 is a similar view of a second embodiment of the control relay and a pair of diaphragm vanes operated thereby.
FIG. 3 is a perspective view of a portion of the control relay shown in FIG. 2.

*Relay structure.*—One embodiment of the present invention is shown in FIG. 1. It comprises an electromagnetic control relay 10, preferably having a soft-iron core 12 carrying an electric winding, or coil 14. A pair of armatures 22 and 24, which may be formed from a single piece of soft-iron resilient material, are secured to the core 12 by a screw 11, and form leaf or cantilever springs cooperating with respective abutment surfaces, or pole faces 13 and 15 of the core 12.

An exposure regulating device, such as a lens diaphragm or a shutter, is controlled either directly or indirectly by one or both of the armatures. In one form of the invention a pair of diaphragm vanes 40 and 50 are integral with armatures 22 and 24 and have respective V-shaped apertures 46 and 52 cooperating with each other and with a taking-lens system, indicated generally at 48, to form a composite exposure aperture for either a still camera or a motion picture camera. The resilient property of armatures 22 and 24 normally maintains the armatures out of engagement with core 12 and in engagement with respective limit members 17 and 19, except when the relay is energized at predetermined levels, as described below. The limit members 17 and 19 may be formed as adjustable, eccentric screws, as illustrated in FIG. 1, so that the outward travel of armatures 22 and 24 can be adjusted. The presence of limit members 17 and 19 also minimizes any "tuning-fork" vibration of the armatures when they are released from the core.

It will be appreciated that the armatures may be formed of permanent-magnet material and that the relay core may be omitted. Therefore, the winding, either alone or along with the core, constitutes an "electromagnet" as that term is employed herein.

Figure 4:
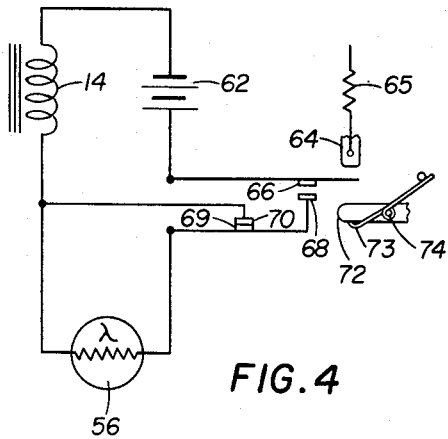
FIGS. 4–7 are schematic wiring diagrams of the programming, or sequencing circuit for the control relay.
Figure 5:
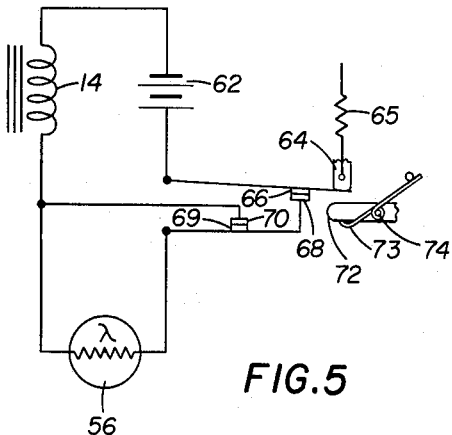
Figure 8:
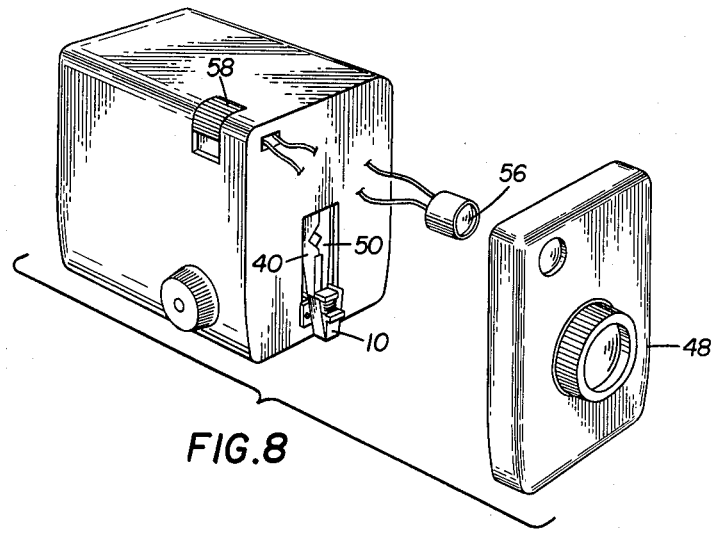
FIG. 8 is an exploded perspective view of a still camera embodying one form of the invention.

*Programming circuit and actuation.*—Referring to FIGS. 4–8, which illustrate one form of the programming or sequencing circuit, one end of the relay winding 14 is connected through a battery 62 to a contact 66, which is movable under control of an arm 64 of a camera actuating member 58 (FIG. 8). As shown in FIG. 4, contact 66 is normally disengaged from a second contact 68, which is integral with a contact 69 and is connected to one terminal of a photoresistive device 56. This device may, for example, be a cadmium sulfide cell. The other terminal of photoresistive device 56 is connected to the second end of winding 14 and to a stationary shorting contact 70. Contact 69 normally engages contact 70 to short the photoresistive device, or cell 56 out of the battery circuit. The operation of the programming circuit and relay is as follows:

When camera actuating member 58 is moved downwardly its arm 64 moves contact 66 into engagement with contact 68 (FIG. 5) thereby completing the battery circuit through contacts 66 and 68, contacts 69 and 70 and winding 14. Because contacts 69 and 70 remain in engagement with each other at this time, cell 56 is shorted out of the battery circuit and a maximum current flows through winding 14, being limited only by the resistance of the contacts, the leads, winding 14 and the internal resistance of the battery. This establishes a magnetic force coupling armatures 22 and 24 to the electromagnet and pulls both armatures against the core, i.e., to their "closed" positions, overcoming their own spring tensions. The diaphragm vanes 40 and 50 move toward each other with the armatures to form an exposure aperture of minimum area. The battery voltage and relay parameters are chosen such that when the armatures are moved to their closed positions the magnetic circuit of the relay, comprising the core 12 and armatures 22 and 24 (FIG. 1), is substantially saturated. In the embodiment of FIG. 1, the two armatures have different spring tensions, tending with correspondingly different forces to restore the armatures to the positions shown in FIG. 1 after they have been attracted to the core by energization of winding 14.

Figure 6:
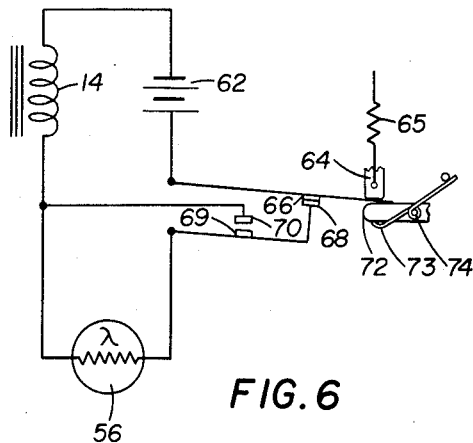
Figure 7:
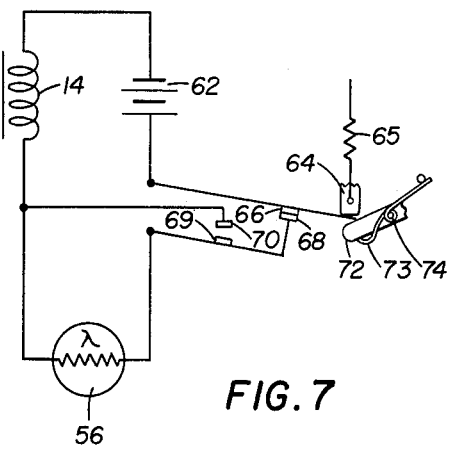

Further depression of a camera operating member 58 causes its arm 64 to move contacts 66 and 68 downward sufficiently to disengage contact 69 from contact 70, thereby opening the shorting circuit and introducing cell 56 into series circuit with battery 62 and winding 14. Cell 56, being exposed to scene or field light, has a resistance which is a function of field brightness and therefore controls the current flowing through winding 14 after contacts 69 and 70 have been separated (FIG. 6).

If the prevailing field brightness is high, the resistance of cell 56 is low and a relatively large amount of current continues to flow through winding 14 thereby maintaining armatures 22 and 24 against core 12. If the field brightness is of a somewhat lower value, the resistance of cell 56 is correspondingly higher and the current through winding 14 is correspondingly lower. Below a first predetermined threshold, or critical value of field brightness, the armature having the greater spring torque applied to it is released from core 12 and moves its diaphragm vane 40 or 50 away from the center, thereby compensatingly increasing the area of the exposure aperture. If the field brightness is below a second and lower threshold value, the resistance of cell 56 is relatively high and limits the current through winding 14 to a value such that the spring torque applied to each armature is sufficient to move it away from the core. This moves both diaphragm vanes 40 and 50 away from a centerline of the relay and forms the largest of three exposure apertures that can be formed with this structure.

Further downward movement of the camera actuating member 58 causes its arm 64 to rock a shutter tripping member 72 counterclockwise about its pivot 74 for operating the camera shutter in a manner well known in the art. Release of actuating member 58 permits it to be returned to its upward position under the tension of a spring 65, thereby restoring the circuit to the condition shown in FIG. 4. The shutter tripping member is restored to its initial position by a spring 73.

In its simplest form, the exposure control system of the present invention may provide only two diaphragm settings and employ a relay having a single armature with an attached vane similar to either of those shown in FIG. 1. The vane then overlies a square aperture (such as shown at 41 in FIG. 10) in a suitable fixed plate aligned with the lens 48, the combination producing a relatively small aperture when the armature is held in by the electromagnet and a relatively large aperture when the armature is released. This inexpensive arrangement is particularly advantageous in a simple box camera.

*Gravity-Balanced relay.*—A modification of the control relay is shown in FIGS. 2 and 3, wherein the relay core 12' is secured to the camera housing by means of a screw 16 and a bracket 18, the bracket in turn being secured to the housing by a screw 20. Armatures 22' and 24' are mounted against core 12' by means of a pair of ears 26 and 28 of bracket 18. Each ear 26 and 28 supports its armature at approximately the center of gravity of the assembly comprising the combined armature and diaphragm vane 40' or 50', thereby permitting the camera to be used in any of various positions without adverse gravity effects on calibration of the system.

A respective nonmagnetic sheet 30 and 33 is secured to the outer surface of each armature 22' and 24', for example by rivets such as 32, and is secured around the free end of its armature, such as at 34 and 35, to form a nonmagnetic shim or spacer between the core 12 and the armature. A portion of each sheet 30 and 33 is bent away from its associated armature and constitutes a leaf spring cooperating with a respective cam 36 secured to a rotatable shaft 38. The current level at which each armature is released from the core can be predetermined by adjustment of the corresponding cam 36. Alternatively, this current value may be predetermined by choosing the proper thickness of each nonmagnetic shim 34 and 35. In FIG. 2 the shims are shown to be of different thickness. Again, the shims may be of different thicknesses, generally establishing the two threshold current levels, with final calibration adjustments for exactly setting such current levels being made by means of cams 36. The use of shims 34 and 35 has the further advantage of preventing magnetic sticking of the armatures against the core.

It will be seen that when the photocell is connected into the programming circuit the control current is too feeble to overcome the armature spring torque when the armatures are in their released positions, the air gaps in the magnetic circuit being relatively large at this time. By shorting the cell to saturate the soft iron in the system a relatively large current is established in the coil to create enough magnetic flux to draw in the armatures, despite the large air gaps. In the absence of this feature it would be necessary to provide some manual means to displace the armatures toward the core during each cycle.

Figure 9:
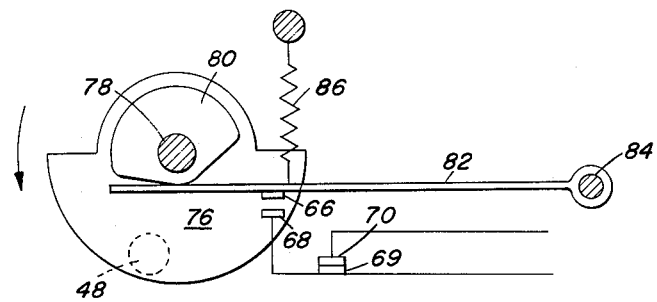
FIG. 9 is a front view of a motion picture camera shutter, showing its relation to the programming circuit for the control relay.

*Circuit timing for motion picture cameras.*—In order to use the foregoing exposure control system in a motion picture camera, the switches of FIGS. 4–7 preferably are operated during the shutter's "dark time," which can be accomplished as follows:

Referring to FIG. 9, a typical cine shutter disk 76 is mounted for rotation with a shaft 78. It will be seen that disk 76 has two segments of different radii, such that the taking lens 48 of the camera is covered and uncovered during predetermined phases of each rotation of the disk, establishing a "dark phase" and an "open phase" for each shutter cycle. A cam 80 also is mounted for rotation with shaft 78 and cooperates with an arm 82, which is pivotally supported on a shaft 84 and is urged clockwise about that shaft by a spring 86. Arm 82 carries the previously described contact 66, which cooperates with contact 68. Contact 69, which is integral with contact 68, cooperates with contact 70 to form a shorting switch as described above and as shown by corresponding reference numerals in FIGS. 4–7.

The shutter disk rotates counterclockwise as indicated by the arrow in FIG. 9. At least once while its segment of larger radius obscures the taking lens 48, i.e., during the "dark" portion of the shutter cycle, cam 80 is in such position as to close both contacts 66 and 68 and contacts 69 and 70 for fully energizing the relay, as previously described. Cam 80 is so related to the configuration of disk 76 that the operating cycle of the control relay, i.e., contacts 66 and 68 closed and contacts 69 and 70 open, is effective during the "open phase" of the shutter cycle.

Alternatively, contacts 66 and 68 could be closed by actuation of the camera operating switch and cam 80 could be employed to hold open shorting contacts 69 and 70 during the "open phase" of the shutter cycle and to allow such contacts to close during each "dark phase" of the shutter cycle for fully energizing the relay as previously described.

Figure 10:
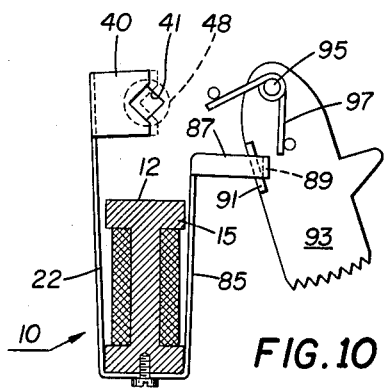
FIG. 10 is a front view, partly in section, of another form of the invention, wherein the control relay operates both a shutter timing member and a diaphragm vane.

*Automatic adjustment of both diaphragm and shutter.*—FIG. 10 illustrates the use of the invention to adjust both diaphragm and shutter speed in a camera. The diaphragm vane 40 is adjusted by armature 22 in the manner hereinabove described. The second armature 85 is employed to adjust the angular position of a speed selecting lever 93 in the retard mechanism of a typical multiple-speed shutter.

Armature 85 has a turned end 87 with an ear 89 at its extremity. Ear 89 cooperates with an ear 91 on the speed selecting lever 93, which is pivoted at 95 and urged counterclockwise about that pivot by a spring 97. In the position shown in FIG. 10, lever 93 establishes one speed of the shutter whereas when armature 85 is pulled against pole face 15 of core 12, as previously described, lever 93 is rocked clockwise against the tension of spring 97 and sets a second shutter speed.

The program of diaphragm openings and shutter speeds may be chosen as desired. Either of the armatures 22 and 85 may be released first to change either the diaphragm or the shutter speed before the other.

OPERATING CHARACTERISTICS OF THE CONTROL RELAY

*In general.*—As indicated above, the threshold current level at which each of the one or more relay armatures is released from the core is determined by a combination of magnetic and spring forces. Although both of these forces may be and preferably are adjustable, it is convenient to describe the operating characteristics of the novel two-armature relay system first by assuming that the armature spring tensions are equal and the air gaps (magnetic forces) unequal and second by assuming the reverse.

Figure 11:
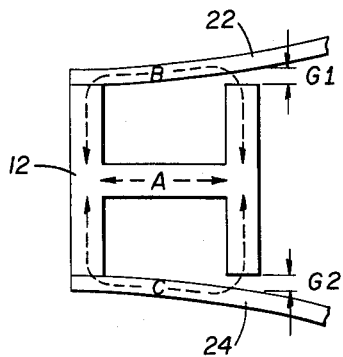
FIGS. 11 and 12 are simplified schematic diagrams of the magnetic circuits of a control relay.

*Equal spring tensions, unequal air gaps.*—FIG. 11 illustrates schematically the magnetic circuit for a two-armature relay, for example of the type shown in FIG. 1. In a first analysis of the characteristics of the magnetic circuit, it is assumed that there is equality between the portions of the reluctances of paths B and C which are due to the ferromagnetic material; that air gaps G1 and G2 are equal when the armatures 22 and 24 both are in their open positions, as shown; and that air gap G1 is smaller than G2 when the armatures both are in their closed positions. From the foregoing assumptions it will be seen that when both armatures are open the total reluctances of paths B and C are equal and that when both armatures are closed the total reluctance of path B is less than that of path C.

Figure 13:
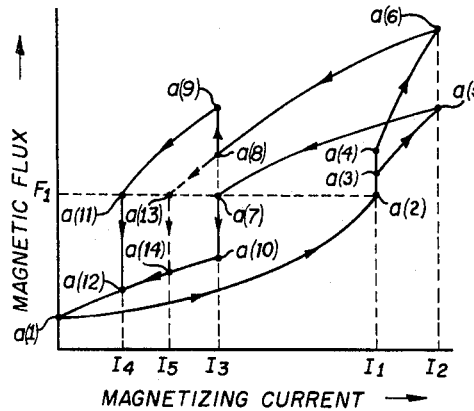
FIGS. 13–15 are graphs showing hysteresis curves for two forms of the invention.
Figure 14:
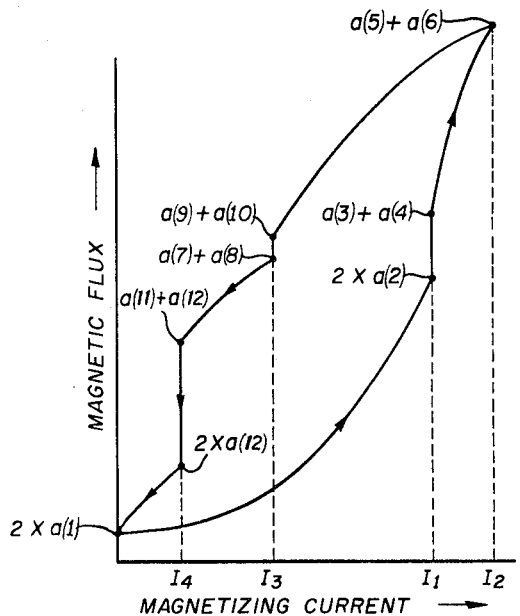

FIGS. 13 and 14 illustrate graphs of magnetic flux versus electrical current with equal spring tensions and unequal air gaps. FIG. 13 illustrates this relationship for paths B and C of FIG. 11 whereas FIG. 14 illustrates the relationship for path A, the flux in path A being at all times the sum of the flux in paths B and C. In FIG. 13, the cycle of path B is $a(1)-a(2)-a(4)-a(6)-a(8)-a(9)-a(11)-a(12)-a(1)$, whereas the cycle of path C is $a(1)-a(2)-a(3)-a(5)-a(7)-a(10)-a(1)$. It is seen that during a first operating phase the flux values in the two paths are equal while both armatures are open, i.e., until the winding current has reached the value $I_1$, at which value the flux becomes sufficient to close both armatures. When both of the armatures close, the air gaps in paths B and C become different, that of path B being less than that of path C, from which it follows that the flux in path B becomes greater than that in path C. In FIG. 13 this is shown by the flux changes $a(2)-a(4)$ and $a(2)-a(3)$, respectively.

When the winding current further increases to its maximum value $I_2$, the flux also increases in both paths B and C ($a(4)-a(6)$ and $a(3)-a(5)$, respectively) until each reaches the cyclic maximum, corresponding to substantial saturation of the ferromagnetic material in each path B and C. The maximum current $I_2$ is controlled by the battery potential and the electrical circuit impedance when switch contacts 66 and 68 (FIG. 5) are closed at the start of the cycle. The time from the start of the cycle through the occurrence of maximum current and flux is referred to herein as the first operating phase of the relay.

Figure 12:
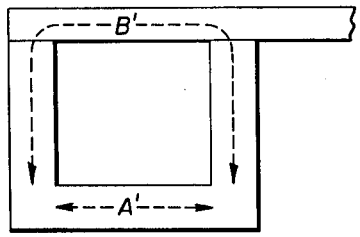
Figure 25:
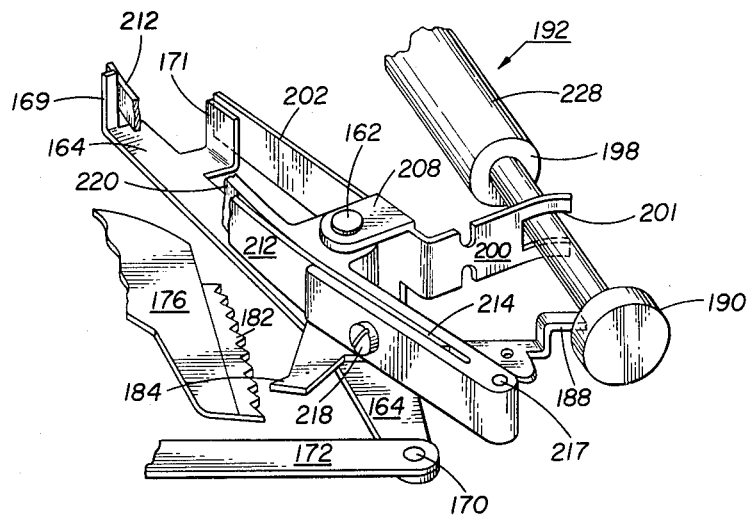
FIG. 25 is a partial perspective view of a further embodiment of the invention wherein the diaphragm vanes are adjustable in fine steps by means of a relay having a single armature.

At point $a(6)$ (FIG. 13) in the magnetic cycle, additional resistance is introduced into the electrical circuit in the form of photocell 56 (FIG. 6) when contacts 69 and 70 are separated. The electrical current then decreases to the value $I_3$ (FIG. 13), where the flux in path B still suffices to hold its armature 22 closed but that in path C does not, and armature 24 is released by its spring. This critical flux value is indicated at $F_1$ in FIG. 13. The suddenly increased air gap in path C, due to the release of armature 24, increases the reluctance in that path, which further decreases the flux in path C, illustrated at $a(7)-a(10)$. FIG. 12 simulates the ideal situation that occurs when armature 24 opens, thereby suddenly introducing a large air gap in path C. Because path A is a part of both paths B and C, as indicated in FIG. 11, and because the area of path A is essentially equally divided between paths B and C, the sudden disappearance of path C flux from path A causes the reluctance of path A relative to path B flux to drop to approximately one-half its previous value. This produces a corresponding increase in the flux linking paths A and B and therefore suddenly increases the path B flux, as illustrated at $a(8)-a(9)$.

Further reduction in current from $I_3$ to $I_4$ (FIG. 13) reduces the flux in path B to the threshold value $F_1$ from $a(9)$ to $a(11)$, at which armature 22 is released. Were it not for the increased flux from $a(8)$ to $a(9)$, due to the release of armature 24, armature 22 would have released sooner as the flux reached the threshold value $F_1$ at a point $a(13)$ and a current $I_5$ greater than $I_4$. It will be noticed from FIG. 13 that the difference between current values $I_3$ and $I_4$ is greater than that between $I_4$ and $I_5$. Having this wider separation between the release values of current for the two armatures has been found to be advantageous, because it renders the relay less critical in operation.

When armature 22, the second armature, is released at point $a(11)$, the air gap in path B suddenly increases, thereby increasing the reluctance in paths A and B and reducing the flux in path B from $a(11)$ to $a(12)$. At this point, the flux values in paths B and C regain substantial identity and maintain such identity throughout the rest of the cycle from $a(12)$ to $a(1)$. The time from the occurrence of maximum current and flux through the end of the cycle is referred to herein as the second operating phase of the relay.

By cycling the ferromagnetic material of the relay through a condition of substantial magnetic saturation during each operating cycle, as illustrated in FIGS. 13 and 14, the operation of the relay and the entire exposure control system remains substantially uniform from one cycle to the next, whereas failure so to saturate results in non-uniform response, from cycle to cycle, evidently due to the effects of magnetic hysteresis.

*Equal air gaps, unequal spring tensions.*—As mentioned hereinbefore, the magnetic characteristics of the control relay can be described on the assumption that the air gaps of armatures 22 and 24 (FIG. 8) are substantially identical, whether both armatures are open or both are closed, and that the tensions of the springs operating against the magnetic forces are different for the two armatures. In such case, the reluctances of paths B and C of the relay are substantially identical except when one armature is closed and the other is open. Inasmuch as the spring tensions are different, the amount of magnetic flux necessary to close one armature (for example armature 22) is greater than that required to close the other armature (in the example, armature 24).

Figure 15:
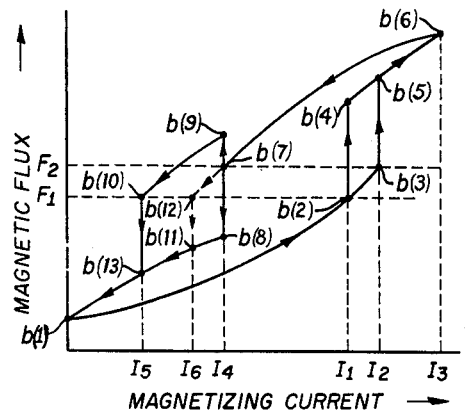

Referring to FIG. 15, the magnetic cycle for path B in this case is $b(1)-b(2)-b(3)-b(5)-b(6)-b(7)-b(8)-b(11)-b(1)$, whereas the cycle for path C is $b(1)-b(2)-b(4)-b(6)-b(7)-b(9)-b(10)-b(13)-b(1)$. The cycle is the same for each of the two paths until the current reaches a first threshold value, $I_1$ (the flux having reached the value $F_1$), which is sufficient to close armature 24. When this occurs, there is a sudden increase of flux, illustrated at $b(2)-b(4)$, in paths A and C due to the decrease in reluctance in path C. When the current reaches a higher threshold value, $I_2$, the flux through path B reaches the value $F_2$, which is sufficient to close armature 22. A sudden increase in flux, illustrated at $b(3)-b(5)$, then occurs in paths A and B, and is due to the decrease in reluctance in path B. It is recognized that the reluctance of path A with respect to paths B and C causes a slight difference in the values of flux $b(5)$ for paths B and C, but this effect has been found to be negligible and does not significantly affect the operation of the exposure control system.

Inasmuch as the reluctances of paths B and C are substantially identical after both armatures are closed, the magnetic cycles are coincident from the point $b(5)$ through substantial magnetic saturation at point $b(6)$, where switch contacts 69 and 70 are opened (FIG. 6) to connect the photocell 56 in series with the battery 62 and the winding 14. As a result of adding the photocell to the circuit, the current in the winding may decrease (depending upon the prevailing value of field brightness) to a value $I_4$ (FIG. 15), at which the flux in each path B and C is at the value $F_2$, corresponding to point $b(7)$ and is no longer sufficient to hold armature 22 in the closed position against the tension of its stronger counteracting spring. When armature 22 opens, the reluctance of path B increases suddenly; therefore the flux in that path decreases as illustrated at $b(7)-b(8)$. The effect of the reluctance of path A, as explained above, causes a simultaneous increase in the flux in path C, as illustrated at $b(7)-b(9)$. If the current decreases still further to the value $I_5$, at which the flux in path C arrives at the value $F_1$, armature 24 also is opened by its weaker spring, thereby decreasing the flux in path C from point $b(10)$ to point $b(11)$ where the curve for path C joins that for path B. Further reduction in current causes both curves to return to point $b(1)$.

Without the increase in flux of path C from $b(7)$ to $b(9)$, the decrease in current below level $I_4$ would have caused armature 24 to open at a point $b(12)$, rather than $b(10)$, thereby reducing the flux along the curve $b(12)$ to $b(13)$ and subsequently from $b(13)$ to $b(1)$. This would have produced a smaller and less desirable separation between the critical or threshold currents $I_4$ and $I_6$ than actually exists between $I_4$ and $I_5$.

In connection with FIGS. 13–15, it will be noticed that none of the magnetic curves have their origins at a flux value of zero. This is due to the residual magnetism of the ferromagnetic material, wherein some small amount of flux persists even after all of the energizing current has ceased.

ARMATURE-SENSING EXPOSURE CONTROL SYSTEMS

Figure 16:
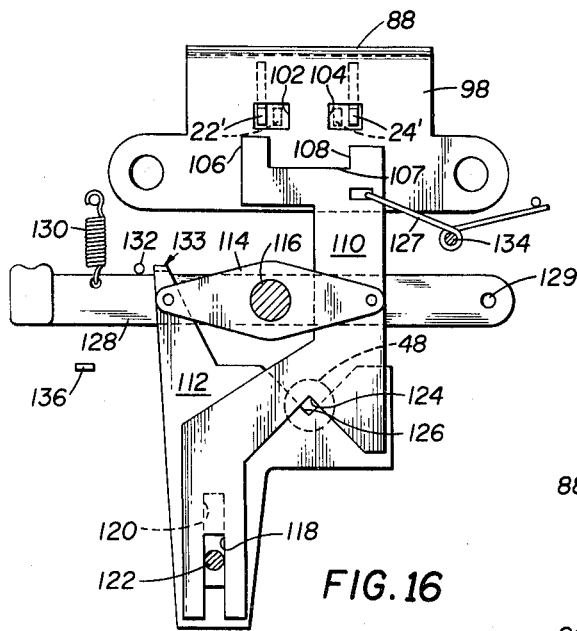
FIG. 16 is a front view of another form of the invention wherein a pair of diaphragm vanes are moved manually, their movement being limited by sensing the positions of the relay armatures.
Figure 18:
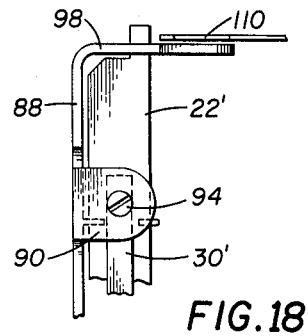
FIG. 18 is a partial side view of the mechanism shown in FIG. 16.
Figure 17:
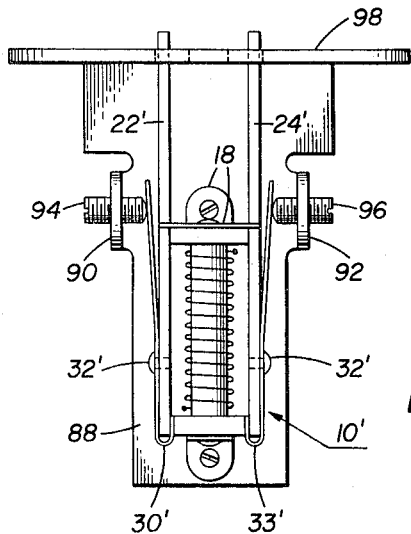
FIG. 17 is a top view of the mechanism shown in FIG. 16.

Another form of the invention is shown in FIGS. 16–18, wherein the armatures are sensed by a manually moved mechanism that is coupled to the diaphragm. The relay armatures 22' and 24' are rocked about a central bracket 18 of the type disclosed in FIGS. 2 and 3, and have respective nonmagnetic spacers or shims 30' and 33' that are secured to the armatures, for example by screws or rivets such as 32'. The free ends of spacers 30' and 33' are formed as leaf springs cooperating with tension-adjusting screws 94 and 96 mounted in ears 90 and 92, respectively, of a mounting plate 88. An upturned end 98 of plate 88 has a pair of apertures 102 and 104 through which the free ends of armatures 22' and 24' extend.

Cooperating with the free ends of armatures 22' and 24' are a pair of arms 106 and 108, separated by a saddle 107, on one end of a diaphragm vane 110. This vane has a slot 118 by which it is mounted for vertical sliding movement on a pin 122. Vane 110 is pivotally secured to a rocker arm 114, which rocks about a shaft 116. Rocker arm 114 is pivotally secured to a second diaphragm vane 112, also mounted for vertical sliding movement by means of a slot 120 engaging pin 122. Vanes 110 and 112 have respective apertures 124 and 126 cooperating with each other and with the taking-lens system 48 to form an exposure aperture. A spring 127 supported on a pin 134 urges vane 110 upward, as viewed in FIG. 16, thereby tending to move the rocker arm 114 counterclockwise about shaft 116, which tends to move diaphragm vane 112 downward.

A manually operated camera actuating member 128 has one end pivoted at 129 and is urged clockwise about that pivot by a spring 130 against a limit stop 132. An ear 133 on vane 112 engages the upper surface of the actuating member 128, so that spring 130, which is stronger than spring 127, normally maintains rocker arm 114 in a clockwise position limited by the engagement of member 128 with stop 130. Thus, spring 130 normally maintains sensing surfaces 106–108 out of sensing engagement with armatures 22' and 24'.

When the actuating member 128 is moved downward to operate the camera, the force of spring 130 is overcome, and the lighter spring 127 is able to drive vane 110 upward and vane 112 downward, thereby enlarging the exposure aperture. The extent of such movement is determined by the engagement of the longer sensing arm 106 with armature 22', or of the shorter sensing arm 108 with armature 24', or by the engagement of saddle 107 with both armatures 22' and 24'. It will be seen that if neither armature has been released, armature 22' is engaged by arm 106 with only a small movement of vane 110, thereby establishing the smallest of the three possible exposure apertures. If only vane 24 has been released it is engaged by arm 108 to establish an intermediate size exposure aperture. If both armatures have been released, saddle 107 engages both of them, resulting in the maximum upward movement of vane 110 and therefore the maximum picture-taking size of the exposure aperture.

After engagement of one or both armatures 22' and 24' by one of the sensing surfaces 106–108, further depression of actuating member 128 does not affect either diaphragm vane. During such movement, member 128 engages a shutter tripping member 136 to take the photograph.

FIG. 19 shows a variation of the foregoing structure, wherein armatures 22' and 24' rock against limit stops 140 when they are released. The armatures are engaged by the respective sensing arms 106 and 108, or saddle 107, of diaphragm vane 110, which moves in a direction parallel to the longitudinal extension of the armatures.

The exposure control system illustrated in FIGS. 16–19 for controlling the lens diaphragm may of course be used to control the shutter in addition to, or instead of the diaphragm. FIG. 20 illustrates the application of this system for controlling the shutter speed.

A blade 110', having sensing arms 106 and 108 and saddle 107 cooperating with armatures 22' and 24', is mounted for vertical sliding movement in the same manner as diaphragm vane 110 illustrated in FIGS. 16 and 19. Blade 110' has an ear 101 cooperating with an ear 99 on the shutter speed control member 93 described in connection with FIG. 10. The three operating positions that blade 110' can assume, in accordance with the collective positions of armatures 22' and 24', permit the shutter speed control member 93 to assume three corresponding positions, as spring 97 urges that member counterclockwise into following engagement with ear 101 of blade 110'.

CALIBRATION ADJUSTMENTS

Referring to FIGS. 17 and 19, the relays are calibrated by first illuminating the photocell at the value of light intensity required for transition from the smallest to the intermediate exposure aperture, i.e., the value at which armature 22' is released. Set screw 94 is then turned to adjust the tension on spring 30' such that the spring tension is just sufficient to cause armature 22' to release at this light intensity. The illumination is then reduced to the value requiring transition from the intermediate to the largest lens stop and set screw 96 is turned to adjust the tension in spring 33' to a value just sufficient to cause armature 24' to release during the relay cycle.

FIGS. 21 and 22 show a modification of the relay design in which a single spring 142 acts upon both armatures 222 and 224, urging the free ends of the armatures toward each other, i.e., urging the armatures toward their released positions relative to the relay core. Because a single spring is used for both armatures, the difference between the two threshold currents, i.e., the current levels at which the respective armatures are released, depends upon relative sizes of the air gaps in the magnetic circuits of the two armatures. These gaps may be adjusted by means of nonferrous screws such as 150 and 152 carried by the armatures 222 and 224, respectively, and abutting a frame member 153 of the relay. This arrangement reduces the number of parts used in the relay, relative to the embodiments shown in FIGS. 17 and 19, and tends to minimize the friction that resists armature movement. A further advantage of this arrangement arises from the fact that the force of spring 142 tending to release the second armature is lessened by release of the first armature, which shortens the spring. This advantage occurs for reasons analogous to those discussed in connection with the electrical current levels illustrated in FIGS. 13–15, where release of the first armature increases the magnetic flux in the second armature, thereby separating the two threshold levels of current more than they would have been separated otherwise.

A greater range of adjustment becomes available when spring 142 is disposed so that its ends are at different distances from the armature fulcrums, as along line 151 in FIG. 22, thus applying dissimilar torques to the two armatures.

FIGS. 23 and 24 illustrate a further structure for adjusting the air gaps by means of nonferrous screws 154 and 156, threadably engaging suitable apertures in an end plate 157 of the relay. The heads of screws 154 and 156 are formed as cams, i.e., are eccentric, and cooperate with the ends of armatures 222 and 224, respectively, to limit the position of the latter with respect to the relay core. This arrangement provides a quicker and more accurate adjustment of the apparatus, because an adjusting screwdriver does not have to be removed from screw 154 or 156 in order for the corresponding armature to release during calibration. By contrast, in the arrangement shown in FIGS. 21 and 22, such a screwdriver must be removed from screw 150 or 152 after each trial adjustment of the screw, in order for the armature to release.

FINE-ADJUSTMENT EXPOSURE CONTROL SYSTEM

FIGS. 25–31 disclose an embodiment of the invention in which one or more diaphragm vanes and/or a shutter speed control member can be adjusted automatically to any of a relatively large number of settings. In FIGS. 25–31 this embodiment of the invention is illustrated as as adjusting two diaphragm vanes, although it will be apparent that it may be used for adjusting a shutter speed control member instead of or in addition to a diaphragm mechanism.

A mechanism plate 160 carries a stub shaft 162 on which a lever 164, constituting an armature, is rotatably mounted. A first diaphragm vane 166 having an aperture 168 is carried by armature 164, which is formed of soft iron and pivotally connected at 170 to one end of a link 172. The other end of link 172 is pivotally connected at 174 to a second diaphragm vane 176, which is pivotally mounted at 180 to plate 160. Vane 176 has an aperture 178 cooperating with aperture 168 of vane 166 to form a composite exposure aperture.

Armature 164 has an ear 169 cooperating with the free end of a cantilever spring 212, the other end of which is secured in a slot 214 of a stationary backing member 220 by a screw or rivet 218. Member 220 is mounted on plate 160 by a pin 217 and by shaft 162. When the system is at rest, spring 212 engages ear 169 to maintain armature 164 in a maximum counterclockwise position against a stop pin 165, where the armature in turn maintains diaphragm vanes 166 and 176 in the positions shown in FIG. 26, forming the largest possible exposure aperture of the system.

A bellcrank 202 is mounted by a bracket 208 on shaft 162 and is urged counterclockwise about that shaft by a return spring 204. The upper end of bellcrank 202 carries a nonmagnetic shim or adjustable spacing screw 210 cooperating with a second ear 171 on armature 164. The bellcrank also carries the relay coil or winding 14 and is formed of soft-iron material to constitute the relay core. When the system is at rest, spring 204 maintains bellcrank 202 in the position shown in FIG. 26. The magnetic circuit comprises bellcrank 202, the gap formed by spacing screw 210, armature 164, shaft 162 and bracket 208.

A second end 200 of bellcrank 202 has a bifurcated tip 201 disposed for cooperation with a shoulder 198 on the shaft of a camera actuating member 192, which is splinemounted for vertical sliding motion in a sleeve 193 of mechanism plate 160. A compression spring 194 is mounted between the upper surface of sleeve 193 and the inside surface of a hollow button 197, which is secured to the actuating member 192 by a screw 199 and forms a part of the actuating member. Spring 194 normally maintains the actuating member in the position shown in FIG. 26, i.e., in its uppermost position.

The lower end of actuating member 192 carries a disk 190, the upper surface of which cooperates with a lever 188, which is pivotally mounted on shaft 162 and is urged clockwise about that shaft by a light spring 186. Lever 188 carries a pawl 184 cooperating with a ratchet 182 integral with diaphragm vane 176. Spring 194 urges disk 190 upward and therefore urges lever 188 counterclockwise against the tension of spring 186, which is weaker than spring 194. A stop pin 189 limits the counterclockwise movement of lever 188 and therefore limits the upward movement of the actuating member 192. Disk 190 on actuating member 192 also cooperates with a shutter tripping member 191 when the actuating member approaches the end of its vertical stroke.

Figure 26:
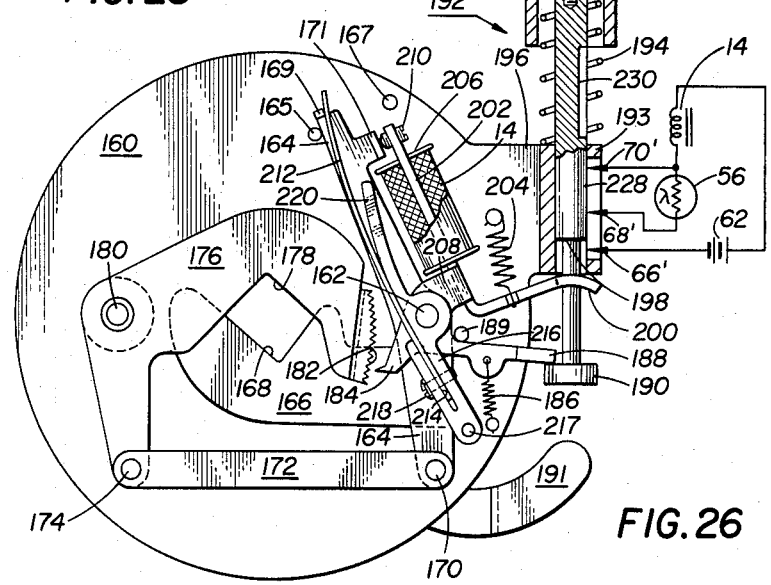
FIGS. 26 and 29–31 are complete or partial front views of the mechanism shown in FIG. 25 in various stages of operation.
Figure 27:
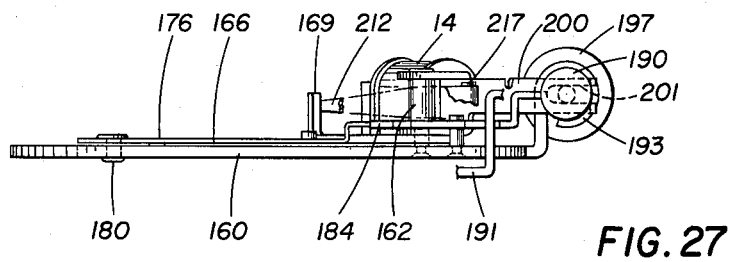
FIG. 27 is a top view of the mechanism shown in FIG. 26.

The shaft of the actuating member 192 includes a cylindrical conducting section 228 cooperating with electrical contacts 66', 68' and 70' corresponding to contacts 66, 68 and 70 of FIGS. 4–7. When the system is at rest as shown in FIG. 26, contacts 68' and 70' engage the conducting surface 228 and therefore short the two leads of photocell 56. In FIG. 26 the relay coil 14 is illustrated both physically and in the schematic wiring diagram. Contact 66' is below and out of engagement with conducting surface 228 and therefore acts as an open switch in the circuit of battery 62 and coil 14.

Figure 29:
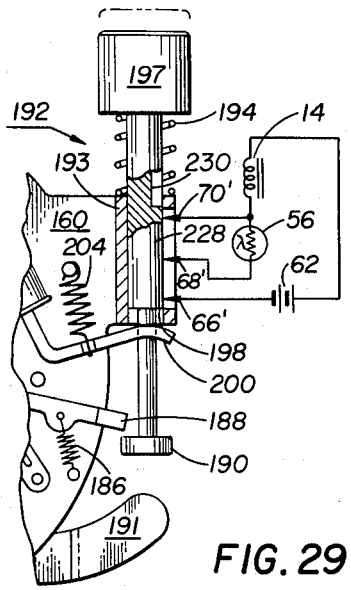
Figure 30:
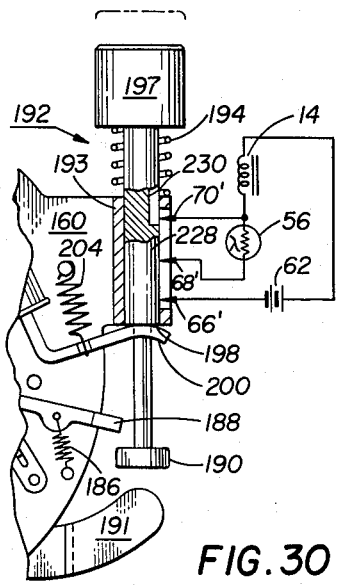

The operation of the exposure control is as follows:

Initial manual depression of actuating member 192 moves disk 190 downward, thereby permitting spring 186 to rock lever 188 clockwise for engaging pawl 184 with ratchet 182. The position of the actuating member 192 at this time is shown in FIG. 29. It will be seen that contacts 68' and 70' remain in engagement with conducting surface 228, thereby maintaining the two leads of photocell 56 shorted, but that contact 66' is now engaged by the conducting surface 228, thereby completing the iron-saturating circuit through battery 62, coil 14 and contact 70', unlimited by the photocell.

Further depression of actuating member 192 (FIG. 30) moves the conducting surface 228 out of engagement with contact 70', which then overlies a cutout or insulating section 230 of the actuating member. This opens the shorting circuit around photocell 56 and completes a series circuit from battery 62 through coil 14, the photocell 56, contact 68', the conducting surface 228 and contact 66', thereby placing the energization of coil 14 under control of the photocell.

Further downward movement of the actuating member 192 (FIG. 31) engages shoulder 198 with the end 200 of bellcrank 202, thereby rocking the bellcrank clockwise about shaft 162. The magnetic flux through bellcrank 202 and armature 164 causes that lever to follow the bellcrank in a clockwise direction about shaft 162 until the increasing tension of spring 212 overcomes the magnetic force holding the bellcrank and the armature together. As armature 164 moves clockwise about shaft 162, it rocks diaphragm vane 166 clockwise and, through link 172, rocks diaphragm vane 176 clockwise about its pivot 180, thereby reducing the size of the exposure aperture. During the adjustment of the diaphragm vanes, pawl 185 is maintained in contact with ratchet 182 by the light spring 186. The clockwise movement of the armature is limited by a stop pin 167.

Figure 28:
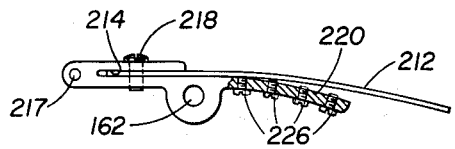
FIG. 28 is a detailed view of a modification of the backing member shown in FIG. 26.

As spring 212 is bent further clockwise about its support 214 by ear 169 of armature 164, it engages an increasingly greater length of a curved free end of the backing member 220. The contour of the free end of member 220 is such that the force of spring 212 varies in correct relation to the geometry of the aperture-forming vanes 166 and 176 and the varying magnetic forces applied between bellcrank 202 and armature 164 under varying light conditions. The response of spring 212 may be calibrated by adjusting the contour of backing member 220, for example, as shown in FIG. 28, through adjustment of a series of set screws 226.

Figure 31:
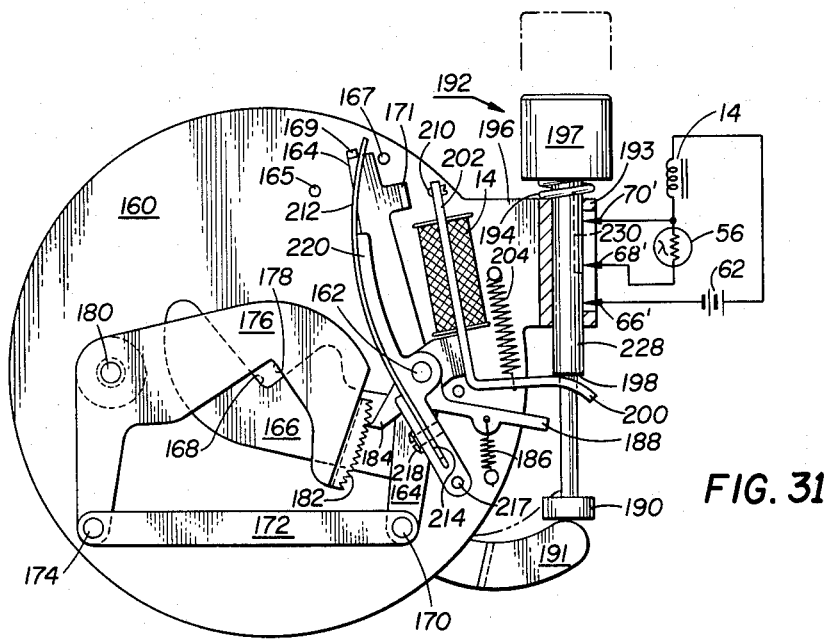

Whenever the force of magnetic attraction between bell-crank 202 and armature 164 comes into balance with the opposing force of spring 212, additional clockwise movement of the bell-crank causes it to separate from the ear 171 of armature 164. Such separation quickly reduces the magnetic flux by virtue of the increased air gap, reducing the force necessary to depress the camera actuating member 192. The armature is held in its displaced position by engagement of pawl 184 with the nearest tooth of ratchet 182, effectively arresting diaphragm vanes 166 and 176 in the positions to which they have been adjusted. Further downward movement of the camera actuating member 192, as illustrated in FIG. 31, merely rocks bellcrank 202 further clockwise against the tension of its return spring 204 and engages disk 190 with the shutter trigger 191 to take the picture. Release of the actuating member 192 restores the system to its initial position, as shown in FIG. 26.

From the foregoing description of the embodiment illustrated in FIGS. 26 to 31 it will be obvious that the number of possible adjusted positions of the diaphragm vanes depends upon the number of teeth in ratchet 182 and upon the repeatability and sensitivity of operation of the relay and magnetic circuits. It has been found that by cycling the magnetic circuit through a state of saturation for each setting of the vanes, as described above, the system's operation is sufficiently precise to provide for a very large number of settings. It will be obvious also that a shutter speed member can be substituted for either or both diaphragm vanes in this embodiment and can be positioned automatically at an equally large number of settings.

THREE-ARMATURE RELAY

FIGS. 32 to 35 illustrate an alternate embodiment of the relay, wherein each of the tow main armatures 22′ and 24′ has two open positions and one closed position, providing a total of four composite positions for contrl of diaphragm or shutter exposure regulating members.

The main armatures 22′ and 24′ are mounted in a manner similar to that shown in FIG. 3, by a bracket 234 secured to an end plate 232 for the coil 14. Nonmagnetic shims 238 and 240 separate one end of each armature 22′ and 24′ from a second end plate 233, the top and bottom surfaces of which act as pole faces for these armatures. Shims 238 and 240 are secured to the armatures by rivets such as 239 and have free spring ends 244 for tension adjustment as previously described.

Figure 33:
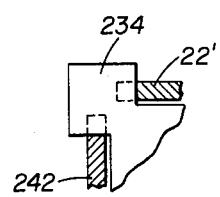
FIG. 33 is a front view of a corner detail of the three-armature relay.

A third armature 236 is similarly mounted by bracket 234, a corner detail of the mounting of which is illustrated in FIG. 33. Armature 236 has a similar nonmagnetic shim 242 separating it from a side surface, constituting a third pole face, of end plate 233. Shim 242 has arms 246 and 248 carrying respective ears 247 and 249 cooperating with ears 250 and 252 of the shims 238 and 240 for main armatures 22′ and 24′.

Figure 32:
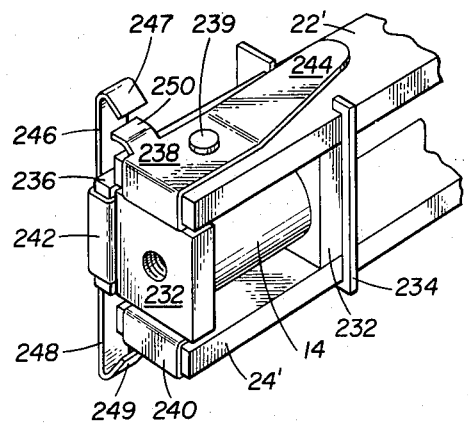
FIG. 32 is a partial perspective view of a three-armature relay according to the invention.

When the relay is energized initially, independently of photocell control, all three armatures 22′, 24′, and 236 are moved to their closed positions as shown in FIG. 32. Under subsequent control of the photocell, at a first reduced level of energization of the relay winding 14, relay 24′ is released and moves until the ears 252 of its shim 240 engages ear 249 of shim 242 on relay 236, as shown in the broken-line position of ear 252 in FIG. 34. At a second and lower energization level, relay 22′ is released and moves until ear 250 reaches its position shown in broken lines in FIG. 34, where it engages ear 247 of shim 242. At a third and still lower level of energization, armature 242 is released, thereby moving ears 247 and 249 to the left and out of the paths of ears 250 and 252, as shown in FIG. 35, and permitting the main armatures 22′ and 24′ to move to their fully released positions.

Figure 34:
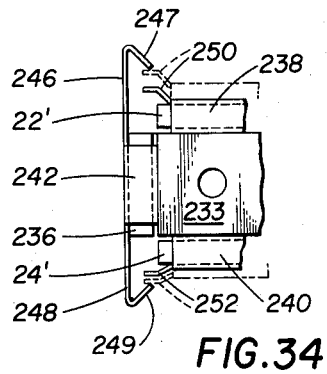
FIGS. 34 and 35 are partial front views of the three-armature relay showing it in various stages of operation.
Figure 35:
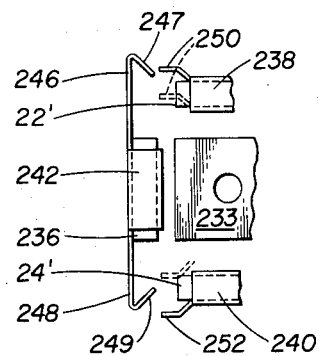

It will be seen that the positions of ears 247 and 249 can be asymmetrical with respect to a horizontal centerline through end plate 233 and that the intermediate position of armature 24′ can be nearer its closed position than is the case with armature 22′, as illustrated in FIGS. 34 and 35. In any case the three armature system provides four composite positions of armatures 22′ and 24′: (1) both armature closed; (2) armature 24′ intermediate; (3) both armatures intermediate; and (4) both armatures fully released. Armatures 22′ and 24′ can be used to control the positions of diaphragm vanes and/or a shutter speed member, for example, as illustrated in FIG. 2, 10, 16 or 20.

The invention has been described in detail with particular reference to preferred embodiments thereof, but it will be understood that variations and modifications can be effected within the spirit and scope of the invention as described hereinabove and as defined in the appended claims.

I claim:

1. In a photographic camera, an exposure control system comprising: an electromagnetic relay having at least one movable, magnetizable armature positioned in accordance with energization of said relay; means for electrically energizing said relay to a predetermined first level; a photoelectric element adapted to be illuminated by scene light; means controlled by said element for sequentially reducing the energization of said relay below said level to a new value as a function of the intensity of illumination of said element; and an adjustable device controlled by said armature for regulating exposure of photographic film in said camera as a function of the position of said armature.

2. The exposure control system defined in claim 1, wherein energization of said relay produces a magnetic force urging said armature in one direction, with spring means urging said armature in the opposite direction.

3. The exposure control system defined in claim 1, wherein said exposure regulating device comprises a shutter speed control member.

4. The exposure control system defined in claim 1, wherein said exposure regulating device comprises a lens diaphragm mechanism.

5. The exposure control system defined in claim 4, wherein said diaphragm mechanism comprises a diaphragm vane integral with said armature.

6. The exposure control system defined in claim 1, with: sensing means coupled to said regulating device for movement in conjunction therewith into sensing engagement with said armature, to limit the adjustment of said regulating device in accordance with the position of said armature.

7. The exposure control system defined in claim 6, wherein said sensing means moves in a direction substantially perpendicular to said armatures.

8. The exposure control system defined in claim 6, wherein said sensing means moves in a direction substantially parallel to said armatures.

9. In a photographic camera, the combination comprising: an electromagnetic relay having at least one movable, magnetizable armature mounted to form a cantilever spring; a photoelectric element illuminatable by scene light; means for energizing said relay alternately and in a sequential fashion (*a*) independently of said element, and (*b*) under control of said element as a function of scene brightness, to produce respective magnetic forces opposing the tension of said spring, said armature being positioned in accordance with energization of said relay; and an adjustable device controlled by said armature for regulating exposure of photographic film in said camera as a function of the position of said armature.

10. In a photographic camera, the combination comprising: an electromagnetic relay having a pair of movable, magnetizable armatures formed of respective free ends of a unitary U-shaped spring member; a photoelectric element illuminatable by scene light; means for energizing said relay alternately and in a sequential fashion (*a*) independently of said element, and (*b*) under control of said element as a function of scene brightness, to produce respective magnetic forces opposing the spring tension of said armatures, each armature being positioned in accordance with energization of said relay; and at least one adjustable device controlled by said armature for regulating exposure of photographic film in said camera as a function of the collective positions of said armatures.

11. In a photographic camera, an exposure control system comprising: an electromagnetic relay having first and second movable, magnetizable armatures; a single spring urging each of said armatures in a respective first direction; a photoelectric element adapted to be illuminated by scene light; means controlled by said element for energizing said relay as a function of the intensity of illumination of said element to produce magnetic force opposing the tension of said spring, for positioning said armatures in accordance with energization of said relay; and at least one adjustable device controlled by said armatures for regulating exposure of photographic film in said camera as a function of the positions of said armatures.

12. The exposure control system defined in claim 11, wherein said spring is coupled to said armatures asymmetrically to apply uneven forces thereto.

13. In a photographic camera, an exposure control system comprising: an electromagnetic relay including an abutment surface and at least one magnetizable armature having a first operating position in substantial engagement with said abutment surface and a second operating position substantially removed from said abutment surface; means for electrically energizing said relay to a predetermined first level; a photoelectric device adapted to be illuminated by scene light; means for sequentially reducing the energization of said relay below said level to a new value as a function of the illumination of said photoelectric device, to position said armature in accordance with prevailing scene brightness; and an adjustable device controlled by said armature for regulating exposure of photographic film in said camera as a function of the position of said armature.

14. The exposure control system defined in claim 13, wherein said armature is in direct contact with said abutment surface in said first operating position.

15. The exposure control system defined in claim 13, with a nonmagnetic spacer separating said armature from said abutment surface.

16. The exposure control system defined in claim 15, wherein said relay has a second armature and a second abutment surface, with a second nonmagnetic spacer separating said second armature from said second abutment surface, said second spacer having a thickness different from that of said first-mentioned spacer.

17. The exposure control system defined in claim 15, wherein said spacer is adjustable.

18. The exposure control system defined in claim 15, wherein said spacer comprises an adjusting screw mounted on said armature and cooperating with said abutment surface.

19. The exposure control system defined in claim 15, wherein said spacer comprises a cam mounted in a fixed position adjacent said abutment surface and cooperating with said armature.

20. The exposure control system defined in claim 15, with: spring means urging said armature toward its second operating position; and means for adjusting the tension of said spring means.

21. The exposure control system defined in claim 20, wherein said spacer and said spring means are formed of a unitary leaf-spring member.

22. The exposure control system defined in claim 20, wherein said spring means comprises a cantilever spring, and wherein said adjusting means comprises a cam cooperating with said cantilever spring.

23. The exposure control system defined in claim 20, wherein said spring means comprises a cantilever spring, and wherein said adjusting means comprises an adjusting screw cooperating with said cantilever spring.

24. In a photographic camera, an exposure control system comprising: an electromagnet; at least one movable soft-iron armature cooperating with said electromagnet and having an open position and a closed position relative to said electromagnet; resilient means exerting a force on said armature for normally maintaining said armature in its open position; means for energizing said electromagnet to a predetermined first level sufficient to overcome the force of said resilient means and to move said armature to its closed position; a photoelectric device adapted to be illuminated by scene light; means for sequentially controlling the energization of said electromagnet as a function of the illumination of said photoelectric device, to position said armature in accordance with prevailing scene brightness; and a member controlled by said armature for regulating exposure of photographic film in said camera as a function of the position of said armature.

25. In a photographic camera, an exposure control system comprising: an electromagnet; at least one movable soft-iron armature cooperating with said electromagnet and having an open position and a closed position relative to said electromagnet; spring means exerting a force on said armature for normally maintaining said armature in its open position; means for energizing said electromagnet to a predetermined level during a first operating phase to overcome the force of said spring means and to move said armature to its closed position, means for sequentially reducing the energization of said electromagnet to a new value below said level during a second operating phase; photoelectric means adapted to be illuminated by scene light; means for effecting control by said photoelectric means of the level of energization of said electromagnet during at least one of said operating phases, for controlling the position of said armature as a function of the illumination of said photoelectric means; and a member controlled by said armature for regulating exposure of photographic film in said camera in accordance with the position of said armature.

26. The exposure control system defined in claim 25, wherein the control by said photoelectric means of the energization of said electromagnet occurs during said second operating phase.

27. In a photographic camera, an exposure control system comprising: an electromagnet; at least one movable armature cooperating with said electromagnet and having only two operating positions relative to said electromagnet; yieldable means normally maintaining said armature in a first one of its operation positions; means for energizing said electromagnet to a predetermined level during a first operating phase to move said armature to the second one of its operating positions; means for sequentially reducing the energization of said electromagnet to a new value below said level during a second operating phase; photoelectric means adapted to be illuminated by scene light; means for effecting control by said photoelectric means of the level of energization of said electromagnet during at least one of said operating phases, for controlling the position of said armature as a function of the illumination of said photoelectric means; and a member controlled by said armature for assuming either of two and only two positions corresponding to the respective operating positions of said armature, for regulating exposure of photographic film in said camera in accordance with the position of said armature.

28. In a photographic camera, an exposure control system comprising: an electric coil; a source of electric power for said coil; a photoresistive element having an electrical resistance dependent upon the intensity of light with which said element is illuminated, said element being exposable to light from a photographic scene; first switch means effective upon actuation thereof for establishing a first electric circuit, including said power source and said coil, for energizing said coil independently of said photoresistive element; second switch means effective upon actuation thereof for establishing a second electric circuit, including said power source, said coil and said photoresistive element, for energizing said coil as a function of the resistance of said element; means armature controlled by said coil for regulating exposure of photographic film in said camera as a function of the level of energization of said coil; and means for actuating said first and second switch means seriatim.

29. The exposure control system defined in claim 28, with: means for operating said actuating means periodically.

30. In a photographic camera, an exposure control system comprising: an electromagnet having at least one pole face; a frame supporting said electromagnet; at least one magnetizable armature pivotally supported by said frame in cooperative relation with said pole face; a spring normally maintaining said armature in a first pivoted position out of engagement with said pole face; a photocell having an electrical resistance inversely related to the intensity of light falling thereon, said photocell being illuminatable by scene light; means for energizing said electromagnet independently of said photocell to move said armature, against the tension of said spring, to a second pivoted position substantially abutting said pole face; means subsequently and sequentially operable for reducing the energization of said electromagnet to a new value in accordance with the resistance of said photocell, permitting said spring to return said armature to its first pivoted position when a relatively low intensity of scene light establishes a sufficiently high resistance of said photocell such that energization of said electromagnet is insufficient to maintain said armature in its second pivoted position against the tension of said spring; and a member integral with said armature for controlling the regulation of exposure of photographic film in said camera in accordance with the pivoted position of said armature, said armature being pivoted approximately at the center of gravity of the assembly comprising said armature and said member.

31. In a photographic camera, an exposure control system comprising: an electromagnet having first and second pole faces; first and second magnetizable armatures disposed in cooperative relation with said first and second pole faces, respectively; resilient means exerting force on said armatures for normally maintaining said armatures in respective first positions out of engagement with said pole faces; a battery; a photocell having an electrical resistance inversely related to the intensity of light falling thereon, said photocell being illuminatable by scene light; first switch means effective, upon operation thereof, for electrically connecting said battery to said electromagnet to energize the latter independently of said photocell, for moving both of said armatures to respective second positions substantially abutting said pole faces, against the force of said resilient means; second switch means effective, upon operation thereof, for electrically and sequentially connecting said photocell to said electromagnet and said battery to reduce the energization of said electromagnet to a new value in accordance with the resistance of said photocell, permitting said resilient means to return each armature to its first position when a relatively low intensity of scene light, different for each armature, establishes a sufficiently high resistance of said photocell such that energization of said electromagnet is insufficient to maintain each armature in its second position against the force of said resilient means; means controlled by said armatures for regulating exposure of photographic film in said camera in accordance with the collective positions of said armatures; and means for operating said first and second switch means seriatim.

32. In a photographic camera, an exposure control system comprising: an electromagnet; first, second and third magnetizable armatures disposed in cooperative relation with said electromagnet; resilient means exerting force on said armatures for normally maintaining said armatures in respective first positions; a photocell having an electrical resistance inversely related to the intensity of light falling thereon, said photocell being illuminatable by scene light; means for energizing said electromagnet independently of said photocell to move all of said armatures to respective second positions against the force of said resilient means; means subsequently and sequentially operable for reducing the energization of said electromagnet in accordance with the resistance of said photocell, permitting said resilient means to move each armature toward its first position when a relatively low intensity of scene light, different for each armature and lowest for said third armature, establishes a sufficiently high resistance of said photocell such that energization of said electromagnet is insufficient to maintain each armature in its second position against the force of said resilient means; means interrelating said third armature and at least one of said first and second armatures for stopping the movement of said one armature at a position intermediate its second and first positions when said one armature is moved by said resilient means toward its first position and when said third armature is in its second position; and means controlled by said first and second armatures for regulating exposure of photographic film in said camera in accordance with the collective positions of said first and second armatures.

33. In a photographic camera, an exposure control system comprising: a movably mounted electromagnet; an armature cooperating with said electromagnet and separately movably mounted; first spring means exerting a force on said armature for normally maintaining said armature in an initial position; second spring means exerting a force on said electromagnet and normally maintaining said electromagnet in an initial position substantially abutting said armature; means for electrically energizing said electromagnet to a predetermined high level for coupling said armature to said electromagnet; means for reducing said level of energization to establish a magnetic force as a function of the brightness of a photographic scene; manually operable means for moving said electromagnet away from its initial position against the force of said second spring, said armature moving with said electromagnet until the force of said first spring equals said magnetic force; an adjustable device coupled to said armature and moved thereby for regulating exposure of photographic film in said camera as a function of the position of said armature; and holding means for maintaining said regulating device in a position to which it has been moved by said armature when the force of said first spring equals said magnetic force.

34. The exposure control system defined in claim 33, wherein said electromagnet and said armature are mounted for pivotal movement about a common axis.

35. The exposure control system defined in claim 33, wherein said regulating device comprises a pair of movably mounted diaphragm vanes, with means intercoupling said vanes for moving them in opposite directions.

36. The exposure control system defined in claim 35, wherein one of said vanes is integral with said armature, and wherein said holding means comprises an assembly including a mutually cooperating pawl member and a ratchet member, one member of said assembly being integral with one of said vanes.

37. The exposure control system defined in claim 33, wherein said first spring means comprises a cantilever spring having an elongated, arcuate backing member, said cantilever spring being disposed for engaging an increasing length of said backing member upon increased movement of said armature away from its initial position.

38. The exposure control system defined in claim 37, with calibrating means for adjusting the contour of said backing member.

39. In an automatic exposure control system for a camera having an exposure control mechanism; a photoelectric transducer, an electrical characteristic of which varies in response to the amount of light falling thereon; and means responsive to such characteristic for controlling said mechanism, said last-named means comprising an electromagnet including an armature means operatively associated with said mechanism, and sequence control means connected to said electromagnet and said transducer initially operative to induce a predetermined value of magnetism in said electromagnet independent of said transducer characteristic and thereafter sequentially modifying such magnetism to a value proportional to said transducer characteristic.

40. In an automatic exposure control system for a camera having an exposure control mechanism: a photoelectric transducer, an electrical characteristic of which varies in response to the amount of light falling thereon; and means responsive to such characteristic for controlling said mechanism, said last-named means comprising an electromagnet including an armature means operatively associated with said mechanism, and sequence control means connected to said electromagnet and said transducer for initially inducing a predetermined high value of magnetism in said electromagnet independent of said transducer characteristic and thereafter sequentially reducing such magnetism to a value proportional to said transducer characteristic.

41. In an automatic exposure control system for a camera having an exposure control mechanism: a photoelectric transducer, an electrical characteristic of which varies in response to the amount of light falling thereon; and means responsive to such characteristic for controlling said mechanism, said last-named means comprising an electromagnet including an armature means operatively associated with said mechanism, voltage supply lines, and sequence control means operative initially to complete a circuit from said supply lines through said electromagnet independent of said transducer and then to effectively sequentially insert said transducer in said circuit in series with said electromagnet.

42. In a photographic camera, an exposure control system comprising: an electric coil; a source of electric power for said coil; a photoresistive element having an electrical resistance dependent upon the intensity of light with which said element is illuminated, said element being exposable to light from a photographic scene; first switch means effective upon actuation thereof for establishing a first electric circuit; including said power source and said coil, for energizing said coil independently of said photoresistive element; second switch means effective upon actuation thereof for establishing a second electric circuit, including said power source, said coil and said photoresistive element, for energizing said coil as a function of the resistance of said element; means for closing said first switch means upon actuation of said camera; and means for actuating said second switch means cyclically.

References Cited by the Examiner

UNITED STATES PATENTS

| | | | |
|---|---|---|---|
| 254,045 | 2/1881 | Randall | 200—95 X |
| 2,161,004 | 6/1939 | Biele | 317—124 X |
| 2,179,717 | 11/1939 | Fedotoff | 95—60 |
| 2,251,473 | 8/1941 | Touceda | 95—64 |
| 2,388,609 | 11/1945 | Ericsson | 95—64 |
| 2,557,774 | 12/1951 | Lee | 95—53 |
| 2,999,445 | 9/1961 | Fahlenberg | 95—53 |
| 3,085,178 | 4/1963 | Brosseau et al. | 317—124 |
| 3,091,164 | 5/1963 | Brandt | 95—10 X |

NORTON ANSHER, *Primary Examiner.*

W. E. JACKSON, *Assistant Examiner.*